United States Patent [19]

Haworth et al.

[11] Patent Number: 4,893,750

[45] Date of Patent: Jan. 16, 1990

[54] FUEL INJECTION NOZZLE

[75] Inventors: Roy Haworth, Greenford; Michael F. Russell, Chalfont St. Peter; Adrian R. Tolliday, Kingslynn, all of England

[73] Assignee: Lucas Industries Public Limited Company, Birmingham, England

[21] Appl. No.: 229,180

[22] Filed: Aug. 5, 1988

[30] Foreign Application Priority Data

Aug. 15, 1987 [GB] United Kingdom ................. 8719372

[51] Int. Cl.⁴ ......................... G01M 15/00; F22G 7/14

[52] U.S. Cl. ................................... 239/71; 239/533.9; 73/119 A; 123/494; 137/551

[58] Field of Search ............. 137/551, 557; 73/119 A; 123/498, 494; 239/585, 533.9, 102.2, 533.11, 533.3, 71

[56] References Cited

U.S. PATENT DOCUMENTS 4,398,670 8/1983 Hofmann ........................ 239/533.11
4,429,570 2/1984 Tinder .............................. 73/119 A
4,624,135 11/1986 Bungay et al. .................. 73/119 A
4,662,564 5/1987 Okuda .............................. 73/119 A

FOREIGN PATENT DOCUMENTS 2143676 3/1973 Fed. Rep. of Germany ... 73/119 A

*Primary Examiner*—Andres Kashnikow
*Assistant Examiner*—Christopher G. Trainor
*Attorney, Agent, or Firm*—Balogh, Osann, Kramer, Dvorak, Genova & Traub

[57] ABSTRACT

A fuel injection nozzle for supplying fuel to a compression ignition engine includes a holder which accommodates a spring which biases the valve member of the nozzle to the closed position. A spring abutment abuts against a surface of the holder and a blind bore is formed in the holder in the vicinity of the surface. A transducer is located in the bore and produces an electrical signal when an increase in the stress in the spring occurs as the valve member is moved to the open position.

6 Claims, 3 Drawing Sheets

FUEL INJECTION NOZZLE

Figure 1:
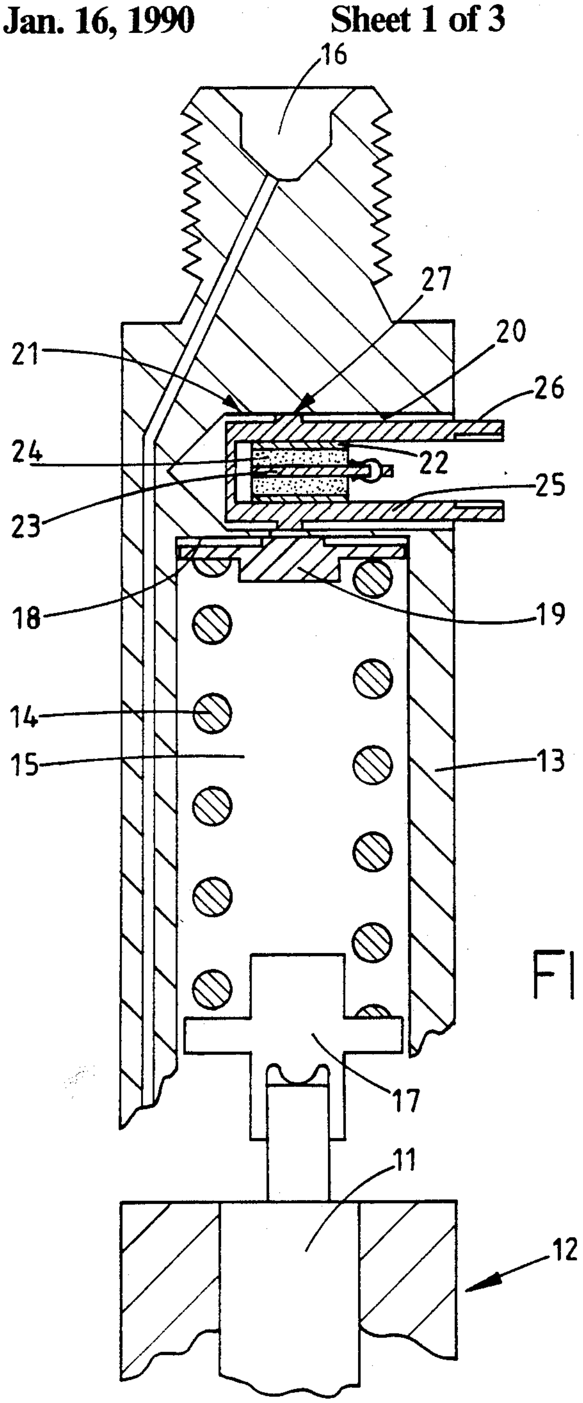

This invention relates to a fuel injection nozzle for supplying fuel to a compression ignition engine, the nozzle being of the kind comprising a valve member which is biased by means of a spring to a closed position and which is moved to an open position against the force exerted by the spring, to allow fuel flow to the associated engine, by the pressure of fuel supplied to an inlet and the nozzle being adapted to carry means for providing an electrical signal indicative of the lifting of the valve member from the seating.

It is known to utilize a piezo-electric or piezo-resistive element as the means for generating the electrical signal and to mount the element intermediate one end of the spring and a reaction surface formed on the nozzle holder or on a part secured thereto, the other end of the spring being operatively connected to the valve member. All the force which is transmitted by the spring is applied to the element and because of the fragile nature of the element, great care has to be taken to ensure that the element is evenly stressed in use. In addition, great care has to be taken to ensure that the element is not unevenly stressed during the assembly and adjustment of the nozzle. The signal provided by the element provides an indication of the lifting of the valve member from the seating and this signal may be utilized in an electronic control system for the fuel system of the engine, and/or for testing purposes to ensure that delivery of fuel takes place at the required time.

It is also known to mount strain gauge elements on a support for the end of the spring remote from the valve member. In both cases the elements are located in the spring chamber of the nozzle in which in the use of the nozzle there is liquid fuel. In the case of the piezo-electric element it is essential to protect the element from the fuel and therefore special sealing arrangements are required. It is less essential to protect certain types of strain gauge elements for example wound elements but in each case it is necessary to pass the electrical connections through the wall of the chamber. Whatever method is employed it is necessary to form an adequate seal against fuel leakage. The provision of effective sealing arrangements adds substantially to the cost of such a nozzle over a conventional nozzle.

The object of the present invention is to provide an injection nozzle of the kind specified in a simple and convenient form.

According to the invention the body of the nozzle defines a support surface for the end of the spring remote from the valve member, and there is formed in the body a blind bore which is open to the exterior of the body, said blind bore in use receiving a transducer element, and the bore being located in the vicinity of said surface whereby the transducer element when inserted in said bore, will provide an electrical signal indicative of changes in the stress in the spring as when the valve member is lifted from its seating.

Figure 2:
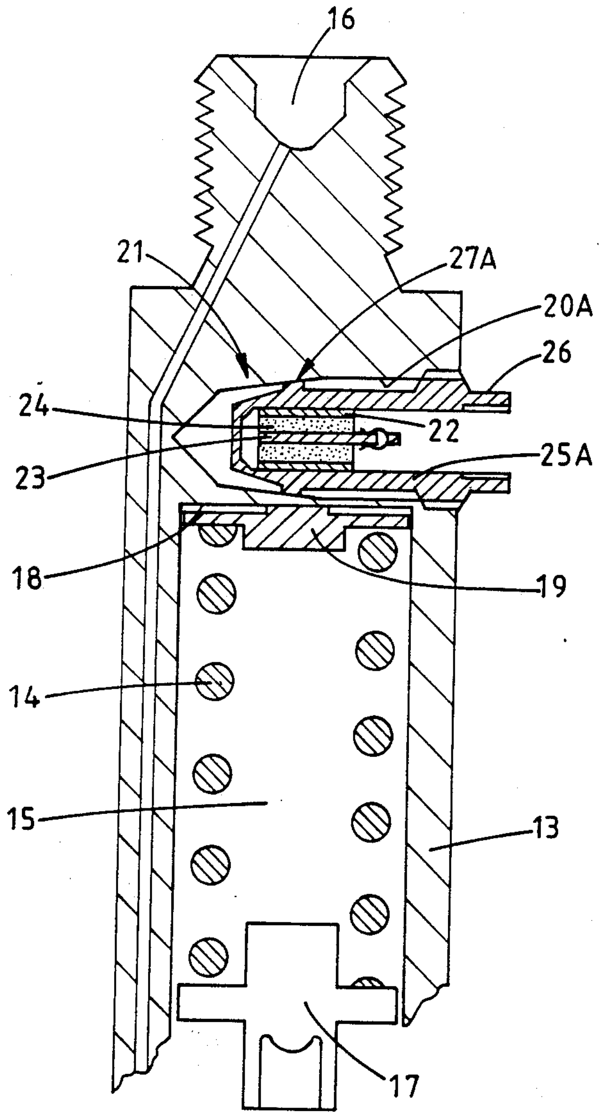
Figure 3:
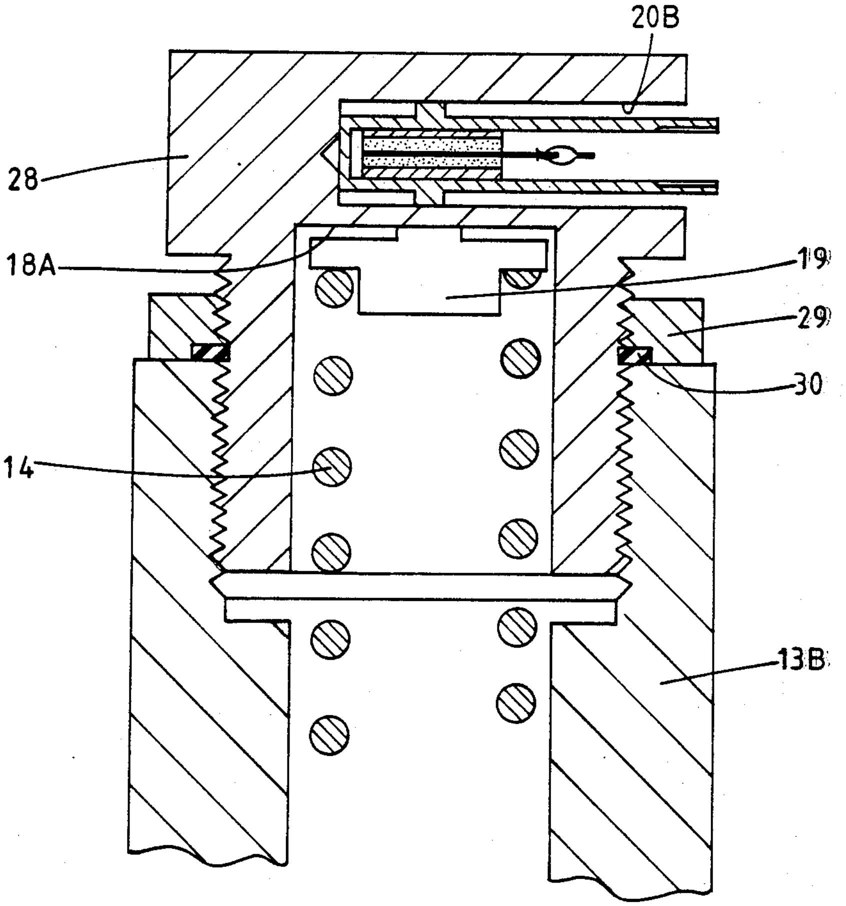

In the accompanying drawings:

FIG. 1 is a part sectional side elevation showing part of a fuel injectional nozzle in accordance with the invention, and FIGS. 2 and 3 are similar views of modified nozzles.

With reference to FIG. 1, a nozzle body or holder 13 has secured to it a nozzle unit 12 in which is mounted a valve member 11 which is urged to the closed position in which it engages with a seating by means of a prestressed coiled compression spring 14 located within a chamber 15 in the holder, the spring bearing against an abutment 17 carried on the valve member. The valve member in known manner, is lifted from the seating by fuel under pressure supplied through an inlet 16, the fuel flowing through a passage in the holder to a further passage in the nozzle body. When the valve member is lifted from the seating fuel can flow from the inlet to an outlet formed in the nozzle unit.

The chamber 15 has an end wall 18 which defines a support surface against which there is located a spring abutment 19 which engages the end of the spring remote from the valve member. Moreover, extending into the holder is a blind bore 20. The axis of the bore is at right angles to the longitudinal axis of the body of the holder and the bore is drilled so that a thin section of wall remains between the bore and the chamber 15. The bore is therefore isolated from the chamber so that fuel within the chamber cannot leak into the bore.

The bore 20 in use is arranged to receive a transducer which is generally indicated at 21 conveniently of the piezo-electric type having an outer metal sheath 22 and a central conductor 23, the two being held in spaced relationship by means of a filling 24 formed from polarized piezo-electric ceramic material. When the sheath is subjected to stress the piezo-electric material is disturbed and an electrical change is developed which results in a change of voltage between the conductor and the sheath.

For permanent installation, the sheath can be a push fit into the bore so long as the slight distortion of the wall of the bore which occurs when the stress in the spring is raised is transmitted to the sheath. In order to enhance the distortion the spring abutment as shown in the drawing, is relieved over its outer portion so that the loading is concentrated in the zone of the bore in which the transducer element is located.

It is convenient to mount the transducer element 21 in a metallic tubular member 25, the outer wall 26 of which is provided with a rib 27 which is a close fit in the bore and which is positioned in use in alignment with the unrelieved portion of the abutment 19. Moreover the inner end of the member 25 is closed and the inner surface at the outer end of the member is threaded to receive an electrical connector which includes a part for connection to the conductor 23.

In the arrangement shown in FIG. 2, the bore 20A has an inner tapered portion and the rib 27A on the tubular member 25A is shaped in like manner. Moreover, the tubular member is provided with a screw thread for engagement with a complementary thread formed at the outer end of the bore. With this arrangement the tubular member and element can be removed if not required, during normal engine operation.

In the arrangement of FIG. 3, the bore 20B is formed in a cap nut 28 which is adjustably mounted in the holder 13B. The cap nut defines a support surface 18A for the spring abutment 19. Adjustment of the cap nut within the holder determines the force exerted by the spring 14. As illustrated the element is mounted in the same manner as the example of FIG. 1 but if desired the alternative form of arrangement of FIG. 2 can be used. If instead of a piezo-electric element a piezo-resistive or strain gauge element is used, the signal provided by the element can be used to provide an indication of the spring force applied to the valve member and hence the nozzle opening pressure. It can therefore be used when adjusting the nozzle. It will still provide a signal indicative of the lift of the valve member when the nozzle is fitted to an engine.

A lock nut 29 is provided to secure the cap nut in position once adjustment has been effected and a resilient seal 30 is provided to establish a fuel tight seal.

By the arrangement described a cheap and simple way is demonstrated for obtaining an electrical signal which can provide an indication of when the valve member of the nozzle is lifted from its seating. The signal can be used in an electronic control system which controls the pump which supplies fuel to the nozzle and/or it can be used when timing the pump relative to the associated engine to ensure that fuel delivery occurs at the correct engine position.

We claim:

1. A fuel injection nozzle for supplying fuel to a compression ignition engine comprising a valve member which is biased to a closed position by means of a spring and which is moved to an open position against the force exerted by the spring by fuel under pressure supplied to an inlet, the nozzle including a body which defines a support surface for the end of the spring remote from the valve member, the nozzle further including a transducer for providing an electrical signal indicative of when the valve member moves to the open position, characterised in that said body defines a blind bore which is open to the exterior of the body, said transducer being located in said bore, and the bore being located in the vicinity of said surface whereby the transducer will provide an electrical signal indicative of changes in the stress in the spring as the valve member is moved to the open position wherein said transducer is contained within a tubular member which is located in the bore, the tubular member being provided with a rib which is a close fit within the bore to concentrate deformation of said tubular member to maximize the output of said transducer.

2. A nozzle according to claim 1 characterised in that said bore is a tapered bore.

3. A nozzle according to claim 2, characterized in that said tubular member and said bore are provided with complementary screw threaded portions to secure the member within the bore.

4. A nozzle according to claim 1 characterised in that said transducer is a piezo-electric device comprising an outer sheath, a central conductor and a filling formed from polarized piezo-electric ceramic material.

5. A fuel injection nozzle for supplying fuel to a compression ignition engine comprising a valve member which is biased to a closed position by means of a spring and which is moved to an open position against the force exerted by the spring by fuel under pressure supplied to an inlet, the nozzle including a body which defines a support surface for the end of the spring remote from the valve member, the nozzle further including a transducer for providing an electrical signal indicative of when the valve member moves to the open position, characterized in that said body defines a blind bore which is open to the exterior of the body, said transducer contained within a tubular member which is located in the bore, the tubular member being provided with a rib which is a close fit within the bore, said rib aligned with an unrelieved portion of a spring abutment which is interposed between the spring and said surface, said bore being located in the vicinity of said surface whereby the transducer will provide an electrical signal indicative of changes in the stress in the spring as the valve member is moved to the open position.

6. A nozzle according to claim 5 characterized in that said bore is a tapered bore.

* * * * *